(12) United States Patent
Mueck et al.

(10) Patent No.: US 9,386,515 B2
(45) Date of Patent: Jul. 5, 2016

(54) USER PREFERENCE AND NETWORK POLICY BASED RADIO LINK SELECTION

(71) Applicant: Intel IP Corporation, Santa Clara, CA (US)

(72) Inventors: Markus Dominik Mueck, Unterhaching (DE); Alexandros Antzoulatos, Athens (GR); Panagiotis Demestichas, Piraeus (GR); Vera Stavroulaki, Athens (GR); Kostas Tsagkaris, Athens (GR); Christian Drewes, Germering (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/332,224

(22) Filed: Jul. 15, 2014

(65) Prior Publication Data

US 2016/0021603 A1    Jan. 21, 2016

(51) Int. Cl.
| | | |
|---|---|---|
| *H04B 1/38* | (2015.01) | |
| *H04M 1/10* | (2006.01) | |
| *H04W 48/18* | (2009.01) | |
| *H04W 48/16* | (2009.01) | |
| *H04W 8/18* | (2009.01) | |
| *H04M 1/725* | (2006.01) | |
| *H04W 88/06* | (2009.01) | |
| *H04W 92/08* | (2009.01) | |

(52) U.S. Cl.
CPC .............. *H04W 48/18* (2013.01); *H04W 8/18* (2013.01); *H04W 48/16* (2013.01); *H04M 1/72519* (2013.01); *H04M 1/72563* (2013.01); *H04W 88/06* (2013.01); *H04W 92/08* (2013.01)

(58) Field of Classification Search
CPC ...... H04W 4/001–4/003; H04W 40/12–40/38; H04W 88/00–88/06; H04W 92/00; H04W 92/08; H04W 92/10; H04W 92/16; H04W 92/18

USPC ............................................ 455/432.1–435.3
See application file for complete search history.

(56) References Cited

U.S. PATENT DOCUMENTS

| | | | | |
|---|---|---|---|---|
| 6,965,948 | B1 | 11/2005 | Eneborg et al. | |
| 2005/0083899 | A1* | 4/2005 | Babbar | H04W 88/06 370/342 |
| 2005/0141447 | A1 | 6/2005 | Carlton et al. | |
| 2010/0056181 | A1* | 3/2010 | Rippon | H04W 8/22 455/456.3 |
| 2010/0099393 | A1* | 4/2010 | Brisebois | H04M 15/28 455/418 |

(Continued)

FOREIGN PATENT DOCUMENTS

KR     10-2004-003763 A    5/2004

OTHER PUBLICATIONS

International Search Report and Written Opinion mailed Sep. 11, 2015 for International Application No. PCT/US2015/033775, 14 pages.

*Primary Examiner* — San Htun
(74) *Attorney, Agent, or Firm* — Schwabe, Williamson & Wyatt, P.C.

(57) ABSTRACT

In embodiments, apparatuses, methods, and storage media may be described for presenting, by a user equipment (UE), a parameter of a network policy to a user, and receiving an indication of the user preference related to that parameter of the network policy. In response to receiving the indication, the UE may select one or more radio links with which the UE should communicatively couple based on the user preference and the network policy. Other embodiments may be described and/or claimed.

22 Claims, 9 Drawing Sheets

(56) References Cited

U.S. PATENT DOCUMENTS

| | | | | |
|---|---|---|---|---|
| 2011/0032857 A1* | 2/2011 | Umeuchi | ............ | H04W 48/20 370/311 |
| 2011/0263246 A1* | 10/2011 | Ruan | ............ | H04L 12/5691 455/426.1 |
| 2011/0286437 A1* | 11/2011 | Austin | ............ | H04W 4/02 370/338 |
| 2011/0294502 A1* | 12/2011 | Oerton | ............ | H04W 4/001 455/426.1 |
| 2012/0009929 A1* | 1/2012 | George | ............ | H04M 3/42263 455/445 |
| 2013/0308445 A1* | 11/2013 | Xiang | ............ | H04W 28/0231 370/230 |
| 2014/0071895 A1* | 3/2014 | Bane | ............ | H04L 69/321 370/328 |
| 2014/0162629 A1 | 6/2014 | Tipton et al. | | |

* cited by examiner

USER PREFERENCE AND NETWORK POLICY BASED RADIO LINK SELECTION

FIELD

Embodiments of the present invention relate generally to the technical field of data processing and data communication and, in particular, to mobile device radio link selection based on user preference and network policy.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Currently, a user equipment (UE) may be positioned to access multiple different radio networks, each using a different radio link. For example, a UE may be able to access both a cellular network and a local network. In some cases, the UE may be provisioned with one or more radio network policies, for example, by an access network discovery and selection function (ANDSF) of the cellular network, which may govern which of the available radio networks the UE connects to. Additionally, in some cases the radio network policies may also govern parameters of the UE's connection to the radio network, for example, data rates, encoding parameters, downlink data transfer parameters, or other parameters of transferring or receiving data using the radio networks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
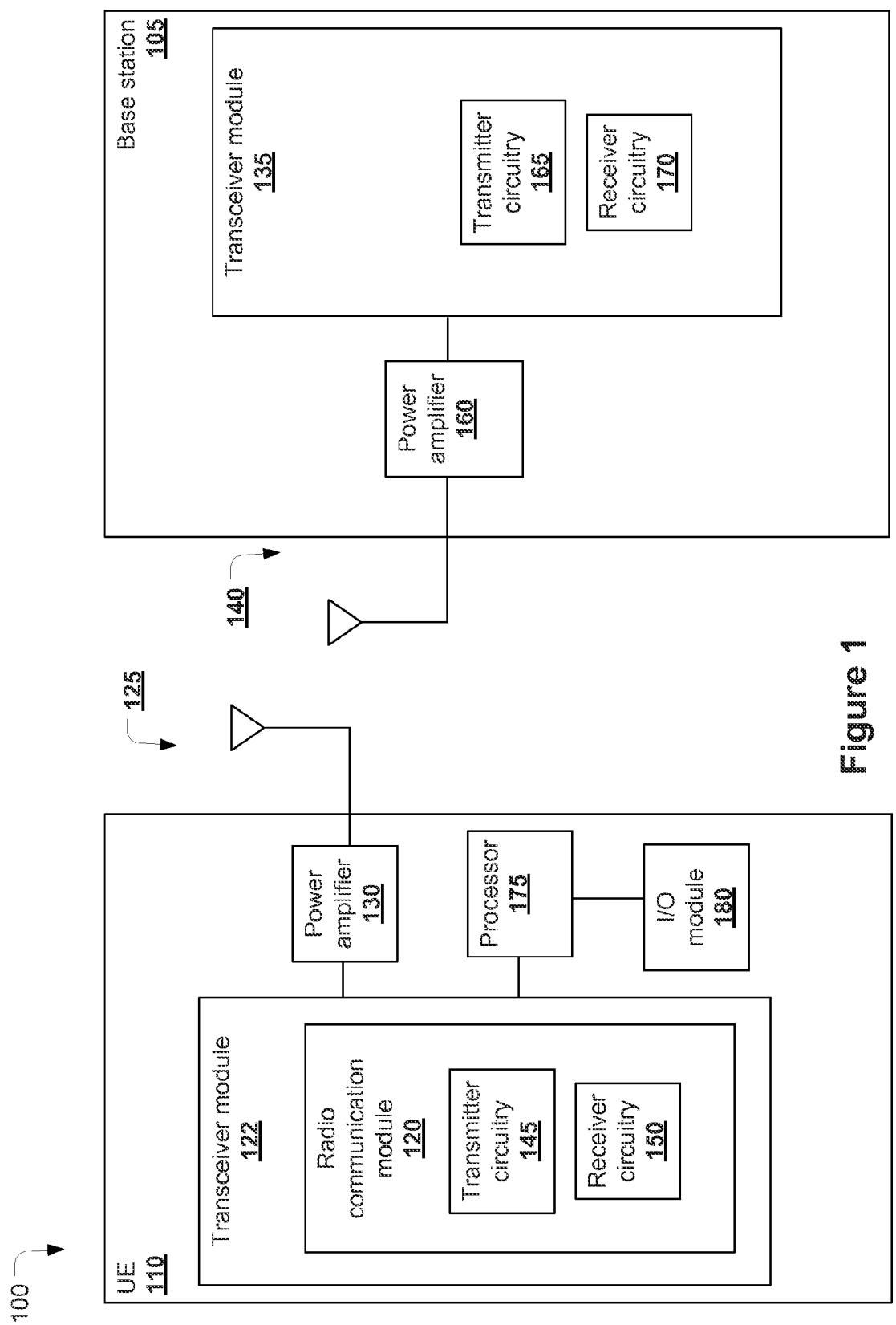
FIG. 1 schematically illustrates a high-level example of a radio network comprising a user equipment (UE) and a base station incorporated with the radio link selection teaching of the present disclosure, in accordance with various embodiments.

In embodiments, apparatuses, methods, and storage media may be described for user preference and network policy based radio link selection. Specifically, embodiments relate to proposed user interfaces such GUIs or an audio interface (herein collectively referred to as user interfaces) that may allow a user to easily, efficiently, and intuitively influence radio link selection decision making, i.e., selection of one or more radio links such as a Wi-Fi link, a long term evolution (LTE) link, etc., over which the UE should send and receive data. In some embodiments, one or more radio links may be operated simultaneously. Specifically, embodiments may relate to how to perform distributed decision-making in a UE, while still meeting network policies and/or operator constraints that are communicated to the UE. Embodiments may also relate to allowing a user, through a user interface, to override operator defined network policies.

Specifically, current solutions may not address multi-link selection decision-making inside of the UE. Rather, radio link selection decisions may mainly occur in the network, and only very limited user direction such as switching from one technology to another (e.g., switching from LTE to Wi-Fi or vice versa) may be possible. By contrast, this disclosure may provide a solution related to the exploitation of the heterogeneous radio framework in a distributed decision-making approach while still meeting operator constraints or network policies. In currently existing solutions, such a joint exploitation of radio access technologies may not be possible, and the overall user experience may be below what is possible. In embodiments of the present disclosure, the user of the UE may be able to exploit the full potential of the entire available radio networks. In particular, the user may be enabled to influence the decision-making process easily, efficiently, and intuitively through a suitable user interface.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 schematically illustrates an example wireless network 100 (hereinafter "network 100") in accordance with various embodiments. The network 100 may include a UE 110 wirelessly communicatively coupled with a base station (BS) 105. In some embodiments, the network 100 may be an access network of a third generation partnership project (3GPP) LTE network. In these embodiments the BS 105 may be a 3GPP-defined eNodeB (eNB, also referred to as an evolved NodeB) configured to wirelessly communicate with the UE 110 using a wireless protocol such as the 3GPP LTE wireless protocol. In other embodiments, the base station 105 and network 100 may be an access point (AP) of a Wi-Fi network as defined by the Institute of Electrical and Electronics Engineers (IEEE) 802.11 standards. In other embodiments, the network 100 may be or include a Global System for Mobile Communications (GSM) radio communication network, a General Packet Radio Service (GPRS) radio communication network, an Enhanced Data Rates for GSM Evolution (EDGE) radio communication network, a 3GPP universal mobile telecommunications system (UMTS) network, a freedom of multimedia access (FOMA) network, a 3GPP LTE-Advanced (LTE-A) network, a code division multiple access 2000 (CDMA2000) network, a Cellular Digital Packet Data (CDPD) network, a Mobitex network, a Third Generation (3G) network, a Circuit Switched Data (CSD) network, a high-speed CSD (HSCSD) network, a wideband code division multiple access (W-CDMA) network, a High Speed Packet Access (HSPA) network, a High-Speed Downlink Packet Access (HSDPA) network, a High-Speed Uplink Packet Access (HSUPA) network, a High Speed Packet Access Plus (HSPA+) network, a UMTS-Time-division duplex (UMTS-TDD), a Time Division-Code Division Multiple Access (TD-CDMA) network, a TD-Synchronous Code Division Multiple Access (TD-SCDMA) network, a 3GPP Release 8, 9, 10, 11, or 12 network, a UMTS Terrestrial Radio Access (UTRA) network, an evolved UTRA (E-UTRA) network, a fourth generation (4G) network, a cdmaOne network, an Evolution-Data Optimized or Evolution-Data Only (EV-DO) network, an Advanced Mobile Phone System (AMPS) network, a Total Access Communication System/Extended Total Access Communication System (TACS/ETACS) network, a Digital AMPS (D-AMPS) network, a Push-to-Talk (PTT) network, a Mobile Telephone System (MTS) network, an improved MTS (IMTS) network, an advanced MTS (AMTS) network, an Offentlig Landmobil Telefoni (OLT) network, a Mobiltelefonisystem D or Mobile telephony system D (MTD) network, a Public Automated Land Mobile (Autotel/PALM) network, an Autoradiopuhelin (ARP) network, a Nordic Mobile Telephony (NMT) network, a Nippon Telegraph and Telephone (NTT) hicapacity (Hicap) network, a DataTAC network, an Integrated Digital Enhanced Network (iDEN) network, a Personal Digital Cellular (PDC) network, a Circuit Switched Data (CSD) network, a Personal Handyphone System (PHS) network, a Wideband Integrated Digital Enhanced Network (WiDEN) network, an iBurst network, an Unlicensed Mobile Access network (UMA, also referred to as 3GPP Generic Access Network, or GAN standard), or some other type of wireless network.

As shown in FIG. 1, the UE 110 may include a transceiver module 122, which may also be referred to as a multi-mode transceiver chip. The transceiver module 122 may be configured to transmit and receive wireless signals over network 100. Specifically, the transceiver module 122 may be coupled with one or more of a plurality of antennas 125 of the UE 110 for communicating wirelessly with other components of the network 100, e.g., BS 105 or another UE. The antennas 125 may be powered by a power amplifier 130 which may be a component of the transceiver module 122, or coupled with the transceiver module 122 and generally between the transceiver module 122 and the antennas 125 as shown in FIG. 1. In one embodiment, the power amplifier 130 may provide the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD), multiple-input multiple-output (MIMO), or full-dimension MIMO (FD-MIMO).

In certain embodiments the transceiver module 122 may include a radio communication module 120, which may be referred to as a broadband module. Radio communication module 120 may contain both transmitter circuitry 145 configured to cause the antennas 125 to transmit one or more signals from the UE 110, and receiver circuitry 150 configured to cause the antennas 125 to receive one or more signals at the UE 110. In other embodiments, the communication module 120 may be implemented in separate chips or modules, for example, one chip including the receiver circuitry 150 and another chip including the transmitter circuitry 145. In some embodiments the signals may be cellular signals transmitted to or received from BS 105. In some embodiments the transceiver module may be coupled with a processor 175 configured to send or receive data to the transceiver module 122. Additionally, the processor 175 may be coupled with an input/output (I/O) module 180 configured to facilitate the transmission of data to, or reception of input from, a user of the UE 110 as will be described in further detail below.

Similarly to the UE 110, the BS 105 may include a transceiver module 135. The transceiver module 135 may be further coupled with one or more of a plurality of antennas 140 of the BS 105 for communicating wirelessly with other components of the network 100, e.g., UE 110. The antennas 140 may be powered by a power amplifier 160, which may be a component of the transceiver module 135, or may be a separate component of the BS 105 generally positioned between the transceiver module 135 and the antennas 140 as shown in FIG. 1. In one embodiment, the power amplifier 160 may provide the power for all transmissions on the antennas 140. In other embodiments, there may be multiple power amplifiers on the BS 105. The use of multiple antennas 140 may allow for the BS 105 to use transmit diversity techniques such as SORTD, MIMO, or FD-MIMO. In certain embodiments the transceiver module 135 may contain both transmitter circuitry 165 configured to cause the antennas 140 to transmit one or more signals from the BS 105, and receiver circuitry 170 configured to cause the antennas 140 to receive one or more signals at the BS 105. In other embodiments, the transceiver module 135 may be replaced by transmitter circuitry 165 and receiver circuitry 170 which are separate from one another (not shown). In some embodiments, though not shown, the transceiver module 135 may include a radio communication module such as radio communication module 120 that includes the receiver circuitry 170 and the transmitter circuitry 165.

In the framework of this disclosure, we may consider a heterogeneous wireless context in which a mobile device such as UE 110 may be able to maintain one or multiple radio links or radio links to a multitude of radio access technologies (RATs) or radio networks (referred to herein collectively as radio networks). In embodiments, the radio links and/or radio networks may be considered wireless radio links and/or radio networks. For example, in some embodiments a multitude of heterogeneous radio links may be operated simultaneously.

Figure 2:
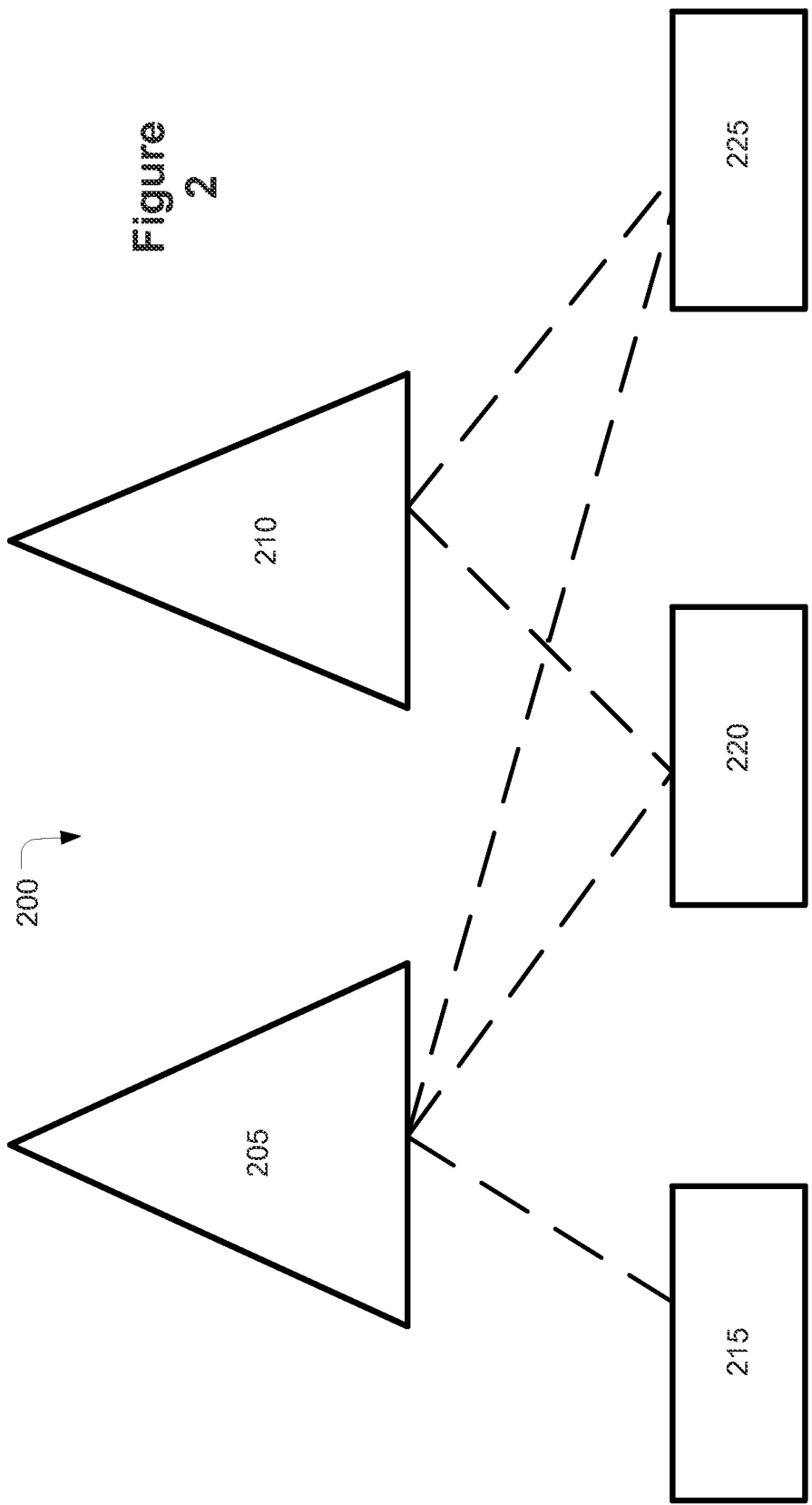
FIG. 2 illustrates a high-level example of a multi-interface radio network, in accordance with various embodiments.

In some embodiments as shown in FIG. 2, a network such as network 200 may include a plurality of different base stations that belong to a plurality of different networks such as the network 100 of FIG. 1. For example, network 200 may include BSs 205 and 210, which may each be similar to BS 105 of FIG. 1. In some embodiments, the network 200 may include UEs 215, 220, and 225, which may each be respectively similar to UE 110 of FIG. 1. The data connection of a UE to a BS may be referred to herein as a radio link. Specifically, a UE 215, 220, or 225 and a BS 205 or 210 may be configured to transmit or receive cellular data, telephonic data, or some other kind of data over the radio link to one another. In FIG. 2, a radio link may be represented by the dashed line between one of the UEs 215, 220, 225, and a BS 205 or 210.

In embodiments, the BSs may be BSs of different networks. For example, BS 205 may be an eNB of a LTE network. BS 210 may be an AP of a Wi-Fi network. In some embodiments, a UE such as UE 215 may only be configured to communicatively couple with BS 205 of the LTE network. However, UEs such as UE 220, or 225, may be configured to communicatively couple with both the LTE BS 205, and the Wi-Fi BS 210.

In some embodiments, it may be desirable for a UE such as UEs 215, 220, and 225 to have a target minimum data rate. In some embodiments, this target minimum data rate may be a total data rate over a plurality of radio links. Therefore, it may be desirable to identify for a given UE 215, 220, or 225 a number of radio links to which the UE should simultaneously connect, which specific radio links or radio networks should be used, and what is a desirable combination of medium access control (MAC) modes for each of the radio links or networks.

In some embodiments, a MAC mode may refer to, for example, a modulation and coding scheme (MCS); constellation types such as binary phase shift keying (BPSK), quadrature phase shift keying (QPSK), quadrature amplitude modulation (QAM) 16/64/128/256/512/1024/2048/etc.; or a code rate such as R=1/2, 2/3, 3/4, etc. One or more of the above described MAC modes may be in combination with MAC mechanisms such as automatic repeat request (ARQ), hybrid ARQ (HARD), or similar MAC mechanisms. In some embodiments, one or more of the above described MAC modes may be in combination with MAC layer retransmission mechanisms or other schemes introducing parameters such as signaling/retransmission overheads or similar parameters.

In this context, network 200 may be assumed to provide a set of network policies that will enforce operator preferences such as MAC modes, data rates, radio network selection, the numbers or types of radio links, or other parameters. These network policies may be used for UE decision-making processes related to which radio network the UE should communicatively couple. In some embodiments, the network policies may be interpreted as optimization constraints to be considered in the mobile centric decision-making process regarding radio network connection. In some embodiments, the network policy based decision-making approach may lead to a distributed decision-making split across network entities (i.e., BSs or core network entities) and UEs such as UEs 215, 220, or 225.

Specifically, a network policy may be considered to be a condition imposed by a wireless system or cellular system operator/owner, or a third party that has a relationship with such network or cellular operators/owners. In embodiments, the condition may constrain the decision-making in the target UE for selecting one or multiple simultaneously operated radio networks. In some embodiments, a network policy may be expressed as a preference (i.e., to be considered optionally in the target UE) or a condition (i.e., to be considered mandatory in the target UE). In some embodiments, the network policy may be transferred over an air interface, for example, through a radio link. In some embodiments, the network policy may be provisioned by an entity of the base station such as base station 205. For example, an entity such as an ANDSF may provide the network policy. In other embodiments, the network policy may be provided by a cognitive pilot channel, or any other suitable means. Alternatively, a set of network policies may be preconfigured in a UE, and the network may simply indicate which network policy needs to be activated/deactivated.

In some embodiments, a network policy may also impact other parameters of the UE that may be considered non-radio selection related parameters of the UE. For example, the network policy may impact data stream parameters such as downlink speed of the UE in order to limit the loading of the network 200, reduce power consumption in the UE, etc.

In some embodiments, a network policy may be interpreted as a network policy imposed by the user to enforce a non-radio related user preference. For example, in order to reduce subscription cost, a user may enforce a preference to exploit a subscription free radio network such as a free Wi-Fi network, as opposed to a subscription-based network such as a cellular LTE network. In some embodiments, the network policy may be an inter-system mobility policy (ISMP), and inter-system routing policy (ISRP), a wireless local area network selection policy (WLANSP), or some other type of network policy. In some embodiments, a network policy may be a policy directly related to a user of a given UE, that is a user-specific policy. In some embodiments, a network policy may be a policy directly related to an application of a given UE, that is an application-specific policy.

In some embodiments, a UE such as UE 215, 220, or 225 may perform local decision making regarding selection of, and connection to, one or more radio networks or radio links. That is, the radio network decision making may be performed in the UE itself, and the decision making may be subject to one or more network policies provided by the network operator of the radio network or some other entity, as described above. In some embodiments, it may be desirable to present a user of the UE with information related to the radio network decision-making, so that the user can affect the network policies. For example, it may be desirable to present a user interface that provides information related to available radio links, and characteristics of those radio links. Additionally, it may be desirable to present the user with information related to one or more network policies, which may be imposed by one or more network operators, to be considered in the UE-centric decision-making process regarding which radio links or radio networks are selected by the UE. Additionally, it may be desirable to provide an interactive interface that allows the user to influence/alternate radio link decisions in an easy, understandable, and intuitive way.

To that end, it may be desirable to inform a user regarding parameters related to available/operated radio links or radio networks. In one embodiment, a menu of three items may be presented to the user such as context data, policies, and video streaming. In other embodiments, more, less, or different data may be presented to the user. Context data may relate to information regarding the status of available radio links such as whether a radio link is "on," "off," "paused," in "sleep mode," etc. Additional information may be presented such as connection names, a service set identifier (SSID) of the Wi-Fi network, a network operator, a specific Internet protocol (IP) address, or signal strength of the various networks.

Figure 3:
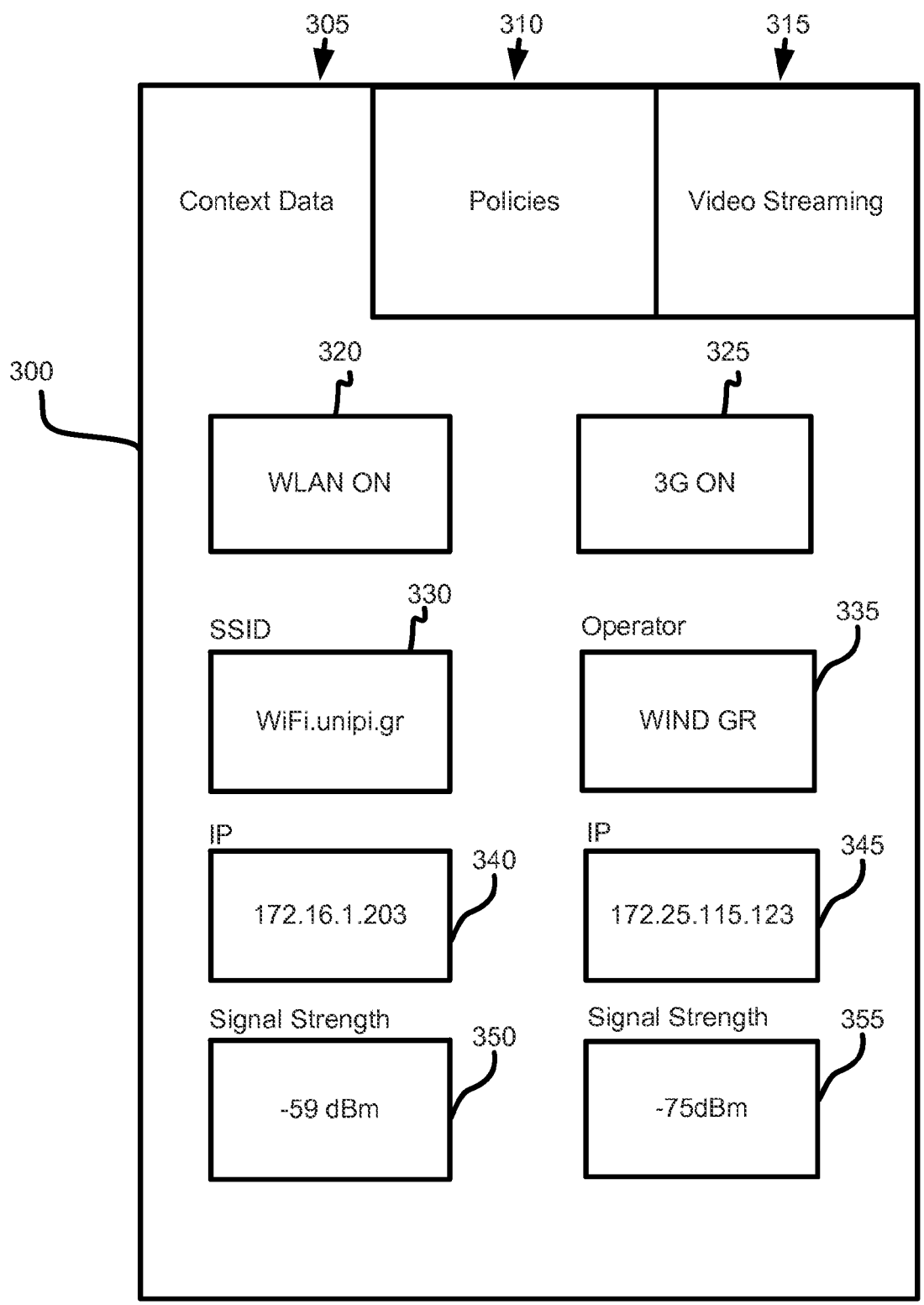
FIG. 3 illustrates an example of a graphical user interface (GUI) of a UE, in accordance with various embodiments.

FIG. 3 depicts an example of a graphical user interface (GUI) 300 showing context data as described above. In embodiments, the context data or one or more elements of the context data may be considered a parameter of the network policy. For example, the GUI 300 may include a tab related to context data 305, a tab related to policies 310, or a tab related to video streaming 315. As shown in FIG. 3, the tab related to context data 305 may be selected. The context data may include elements depicting information related to specific radio networks such as a wireless local area network (WLAN) 320, or a cellular network such as a 3G network 325. The WLAN network of element 320 may be, for example, a Wi-Fi network. In other embodiments it may be a different type of WLAN network. Similarly, the cellular network referred to as element 325 may be, for example, a 4G network such as LTE, or some other type of cellular network. Elements related to context data for additional or alternative networks may be displayed in GUI 300 in other embodiments.

The GUI 300 may include further information elements related to one or more of the networks. For example, the GUI 300 may include an element 330 depicting information related to an SSID of the WLAN network. Additionally, the GUI may include an element 340 depicting information related to an IP address of the WLAN network, or an element 350 depicting information related to signal strength of the WLAN network. Additionally, the GUI 300 may include an element 335 depicting information related to a network operator of the cellular network, an element 345 depicting information related to an IP address of the cellular network, or an element 355 depicting information related to signal strength of the cellular network.

Video streaming data may depict information related to multi-link video streaming, that is, information related to video streaming over two or more radio links. For example, in some embodiments data may be streamed over two networks, such as a Wi-Fi network and cellular network. In other embodiments, different or additional networks may be used for video streaming. In some embodiments, only a single radio network may be used for video streaming. The video streaming information may also include information of total received data over the radio links The video streaming information may be generalized to any type of single or multiple radio network traffic (e.g., uplink and or downlink) for which the traffic is transported on one or more radio links (typically on distinct radio links or radio networks). In some embodiments, if multiple radio networks are used, the radio networks may be operated simultaneously with one another.

Figure 4:
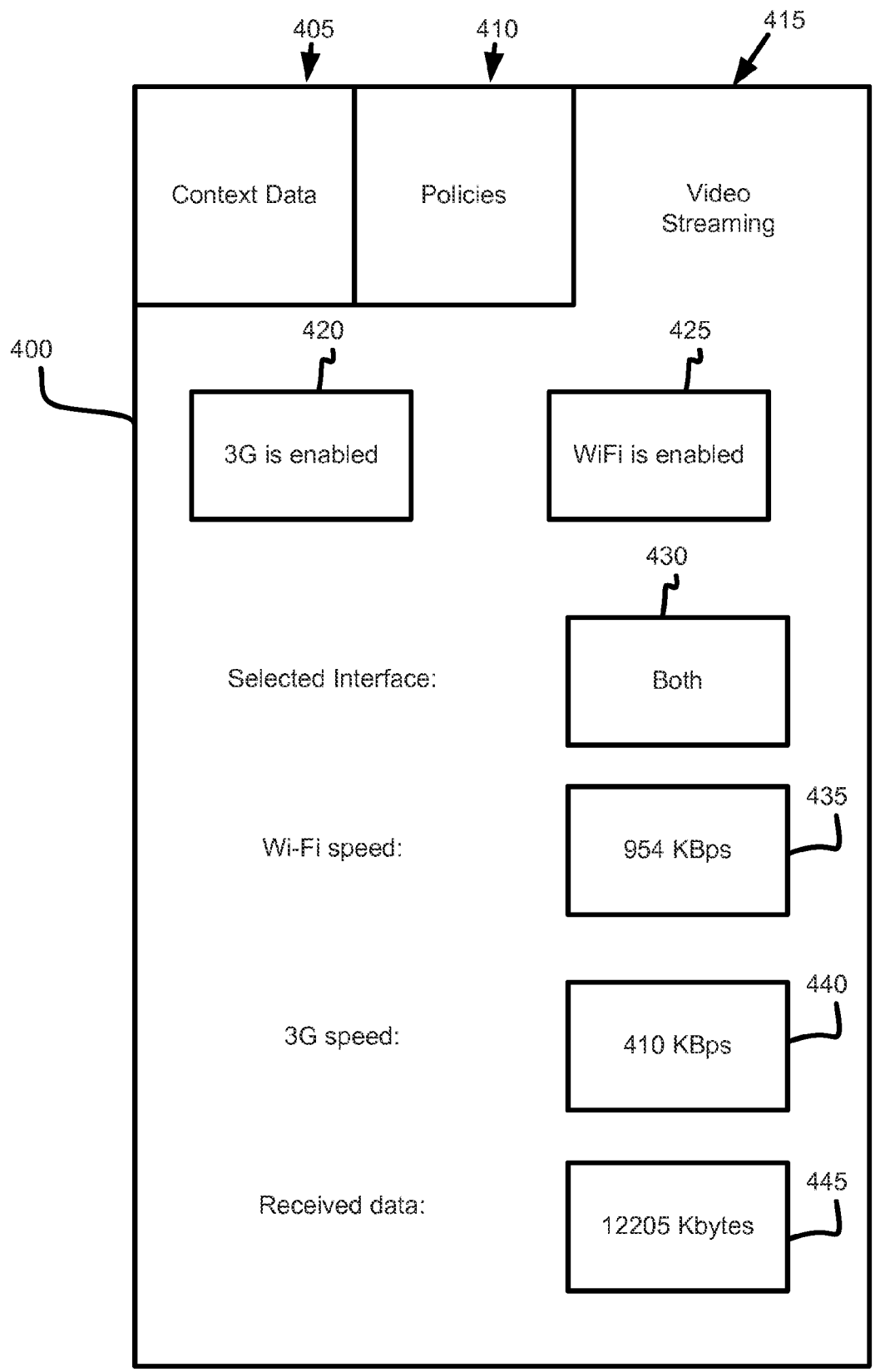
FIG. 4 illustrates an alternative example of a GUI of a UE, in accordance with various embodiments.

FIG. 4 depicts an example of a GUI 400 depicting video streaming information. In embodiments, the video streaming data or one or more elements of the video streaming data may be considered a parameter of the network policy. For example, the GUI 400 may include a tab related to context data 405, a tab related to policies 410, or a tab related to video streaming 415. In some embodiments, the GUI 400 may include an element 420 depicting information related to a cellular radio network such as a 3G network, an LTE network, or some other type of cellular radio network. The GUI 400 may also include an element 425 depicting information related to a WLAN network such as a Wi-Fi network. The GUI 400 may also include an element 430 depicting information related to which interface is being used to download or stream video. For example, as shown in FIG. 4, both the 3G radio network and the Wi-Fi radio network may be used to download video. In other embodiments, only one of those networks may be used for video. Additionally, the GUI 400 may include an element 435 depicting information related to the download speed of the Wi-Fi network, or an element 440 depicting information related to the download speed of the cellular radio network. The GUI 400 may also include an element 445 depicting information related to the total amount of data received over the one or more radio networks. In other embodiments, the GUI 400 may include elements depicting additional or alternative information related to the various networks than those shown in FIG. 4. In some embodiments, the GUI 400 may be configured to dynamically add or delete additional elements of information, as additional or alternative networks are available or unavailable.

The example GUIs 300 and 400 shown in FIGS. 3 and 4 are only examples. In some embodiments, the signal strength may not be shown in decibels, but instead may be described as "low," "medium," "high," "not available," "best," or some other designator. Similarly, the element 435 related to the download speed of the Wi-Fi network, or the element 440 related to the download speed of the cellular radio network may be presented using different values or indicators. In some embodiments, various elements, for example, elements 420 or 425, may be presented as interactive buttons or controls that the user may activate (either directly or through some other interface as explained below) to influence the connection of the UE with a radio network. For example, in some embodiments the user may be able to directly or indirectly interact with the cellular radio network information element 420, or the Wi-Fi information element 425 to force the UE to connect or disconnect with one or more of the radio networks. Additionally, the user may be able to interact with the interface element 430 to select which radio network UE should be streaming video from. In other embodiments, the user may be able to interact with one or more of the other elements or indicators of the GUIs 300 or 400.

Policy data may relate to information on available network policies provided by the network operator. For example, network policies may be highlighted and then can be directly influenced by the user of the UE. For example, a user may be able to manually override one or more network preferences in the network policy. Policies that may not be influenced by the user may not be presented in some embodiments, or may only be presented upon request by the user.

Figure 5:
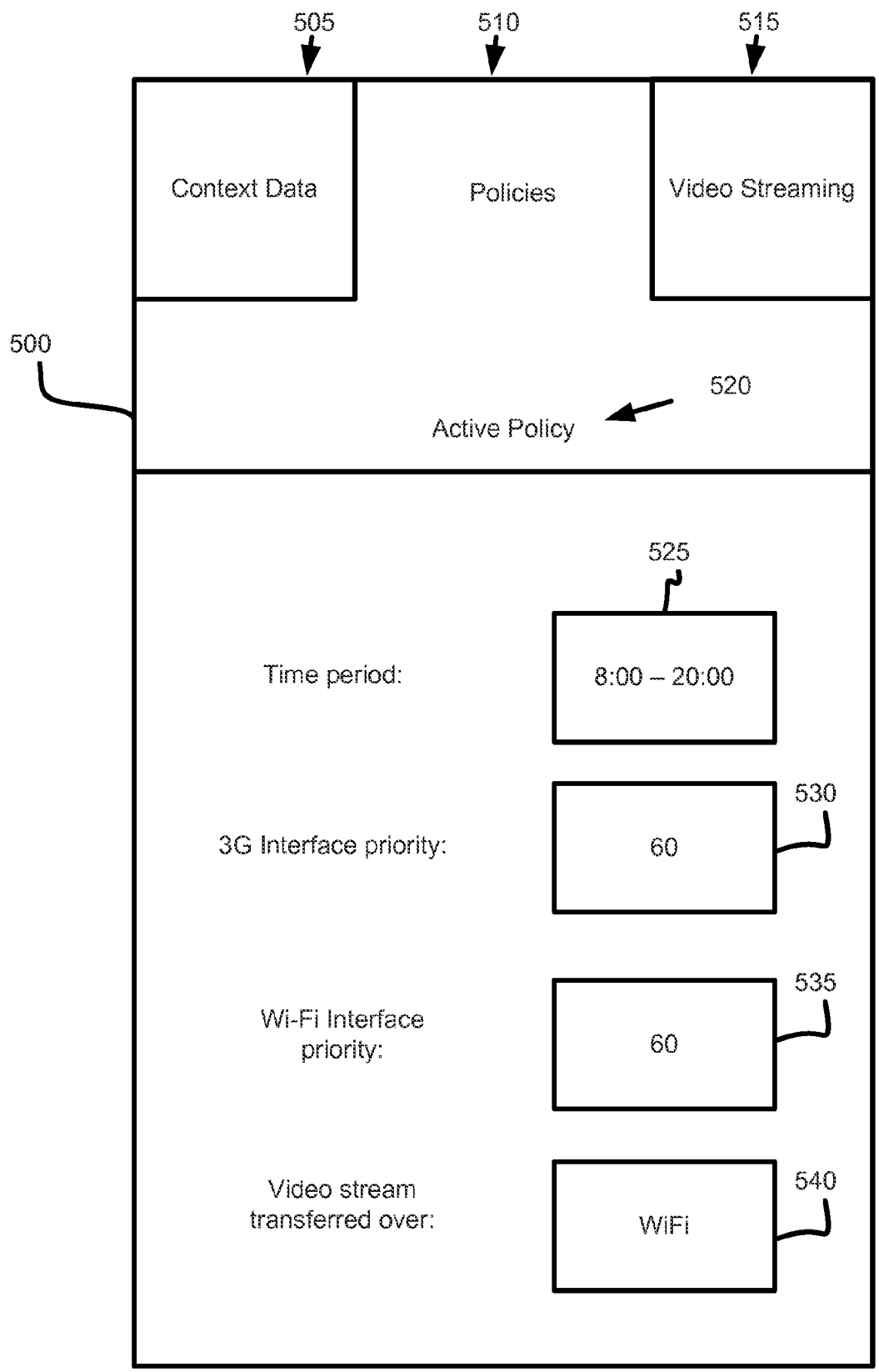
FIG. 5 illustrates an alternative example of a GUI of a UE, in accordance with various embodiments.

FIG. 5 depicts an example of a GUI 500 depicting network policy data. In embodiments, the network policy data or one or more elements of the network policy data may be considered a parameter of the network policy. For example, the GUI 500 may include a tab related to context data 505, a tab related to policies 510, or a tab related to video streaming 515. The GUI 500 may further include an indicator 520 that the network policy being displayed on the GUI 500 is the currently active network policy. The GUI 500 may display elements related to one or more parameters of the network policy, such as an element 525 depicting information related to a time period for which the network policy is active, an element 530 depicting information related to a relative priority of a first radio network such as a 3G cellular network, an element 535 depicting information related to a relative priority of a second radio network such as a Wi-Fi network, and an element 540 depicting information related to an indication of a radio network over which video data should be streamed.

Specifically, the time period element 525 may indicate the validity of the network policy during a given time of the day. In some embodiments, further details on time or date related to validity of the network policy may additionally or alternatively be presented. For example, a policy may only be applicable or inapplicable on a certain day of the week, on a certain day of the month, or based on some other time or date related parameter.

The relative priority elements 530 and 535 may present a priority value for the specific radio networks. For example, a cellular network such as a 3G network may have a higher priority than a Wi-Fi network. In that case, when the UE is identifying radio networks to which the UE should connect, the UE may first attempt to connect to the 3G network. Alternatively, if the UE is connected to both radio networks, the UE may attempt to maintain a higher data rate stream from the cellular network than the Wi-Fi network. In some embodiments, the relative priorities may be influential, rather than determinative, and be influenced by one or more other network operator parameters that are not displayed to the user of the UE. The radio network indication 540 may indicate whether a given data stream is transferred over a single radio network or a plurality of radio networks. In some embodiments, one or more additional or alternative parameters may also be displayed by GUI 500, or fewer parameters may be displayed by GUI 500. For example, an indication of an audio stream transfer may also be displayed. In some embodiments, the audio stream and the video stream may be transferred over different radio networks.

In some embodiments, the user of the UE may alter one or more of the network policy parameters. For example, the user may be able to change the time period or the radio network priorities of the network policy displayed by GUI 500. In some embodiments, the alterations allowed to the network policy may be set by the network operator or network load dependent. For example, if a given radio network is currently experiencing a high load, then the network policy may not be alterable by the user. If the radio network is experiencing very low load, then the network policies may be alterable by the user. In some embodiments, the network policy may only be alterable by the user within a certain range, for example, the interface priority may only be changeable within a certain range. In some embodiments, the network policy may include an XML field, which may for example be named <andsf-strict>, and which may be used to define that the policy is "strict," or "not strict." If the network policy is defined as strict, then the network policy may not be able to be overridden by the user. If the network policy is defined as not strict, then in some embodiments the user may be able to alter one or more parameters of the network policy. In some embodiments, the user of the UE may be able to additionally change one or more of the information elements of GUIs 300 or 400. However, in other embodiments the information depicted in GUIs 300 and 400 may not be alterable by the user, or may be dependent upon the specific network policy or network policy parameters depicted in GUI 500. For example, the selected interface element 430 of GUI 400 may be directly dependent upon element 540 of GUI 500.

These alterations by the user may be considered an expression or an indication of a user preference. For example, a user preference may include any preference or condition originating from a user, or by an application or service that is used or operated by the user or the UE. For example, a user may be able to impose preferences for certain radio networks or radio links such as subscription free radio links. Alternatively, the user may be able to prioritize radio networks on an application specific basis. For example, an application such as a video streaming application may enforce or prioritize high quality of service (QoS) radio networks such as LTE over low QoS radio networks such as first-generation Wi-Fi networks.

In some embodiments, user preference may be explicitly expressed by a user, for example, by indicating a preference for certain radio networks. Additionally/alternatively, the user preference may be implicitly expressed by the user, for example, if the user is accessing a certain service then it may be implicitly clear that a radio network with the specific QoS is required or sufficient. In some embodiments, user preference may be introduced by an action by the user during the radio network selection process. Alternatively, a user preference may be predefined for a set of applications, use cases, radio networks, or radio links, and the decision-making functionalities of the UE may be configured to access those predefined user preferences without any specific interaction on the part of the user during the radio network selection process. In some embodiments, a combination of dynamic and pre-provisioned user preference indications may be possible. For example, the UE may have been pre-provisioned with a predefined set of user preferences, but may still present the user with one or more options that the user may use to directly influence or interfere with his or her radio network selection process. For example, a user may still be able to select one of a number of possible radio network policies or radio network policy configurations, among which a single final radio network policy configuration may be selected.

In some embodiments, the UE may be configured to receive an indication of the user preference through direct user interaction. For example, a user may provide a number, letter, or other similar indication through a keyboard, keypad, mouse, voice input, touchscreen, etc. In other embodiments, the user may provide the indication of the user preference by selecting one of multiple possibilities from a set of buttons, from menus, etc., or the user may provide the user preference through a voice indication, movement of the device, a touchscreen, or some other form of input described herein. In some embodiments, the reception of the indication may occur during the time of the decision-making in the UE regarding the radio network or radio link to which the UE should couple. Alternatively or additionally, the reception of the indication may occur earlier. For example, an indication may be given by a user in order to preconfigure future radio link or radio network selection decision-making Then, the indication may only be processed at a later point in time when the actual radio link or radio network decision-making occurs. In some embodiments, the indication may occur remotely, for example, the user may not directly provide the indication on the UE itself, or rather may provide the indication to another device which then provisions the indication to the UE. For example, the user may provide the indication to a remote laptop, and the remote laptop may then configure the UE.

Additionally, even though embodiments described herein included GUIs such as GUIs 300, 400, 500, or 600 (as will be described below), in some embodiments the user may be informed of the different network policies of the different parameters by nongraphical means such as a speaker, haptic feedback, or one or more other forms of output by the UE.

In some embodiments, before a user of the UE is presented with GUI 500, the user may be presented with information regarding a number of available network policies. The user may then select, by one or more of the input options described herein, further information regarding one or more of the available network policies. Then, a new window may open that displays a list of available policies, and some amount of information regarding one or more of the policies. The user may have the ability to view the information for one or more of the available policies by selecting each policy. In some embodiments, information regarding a plurality of policies may be displayed simultaneously.

Figure 6:
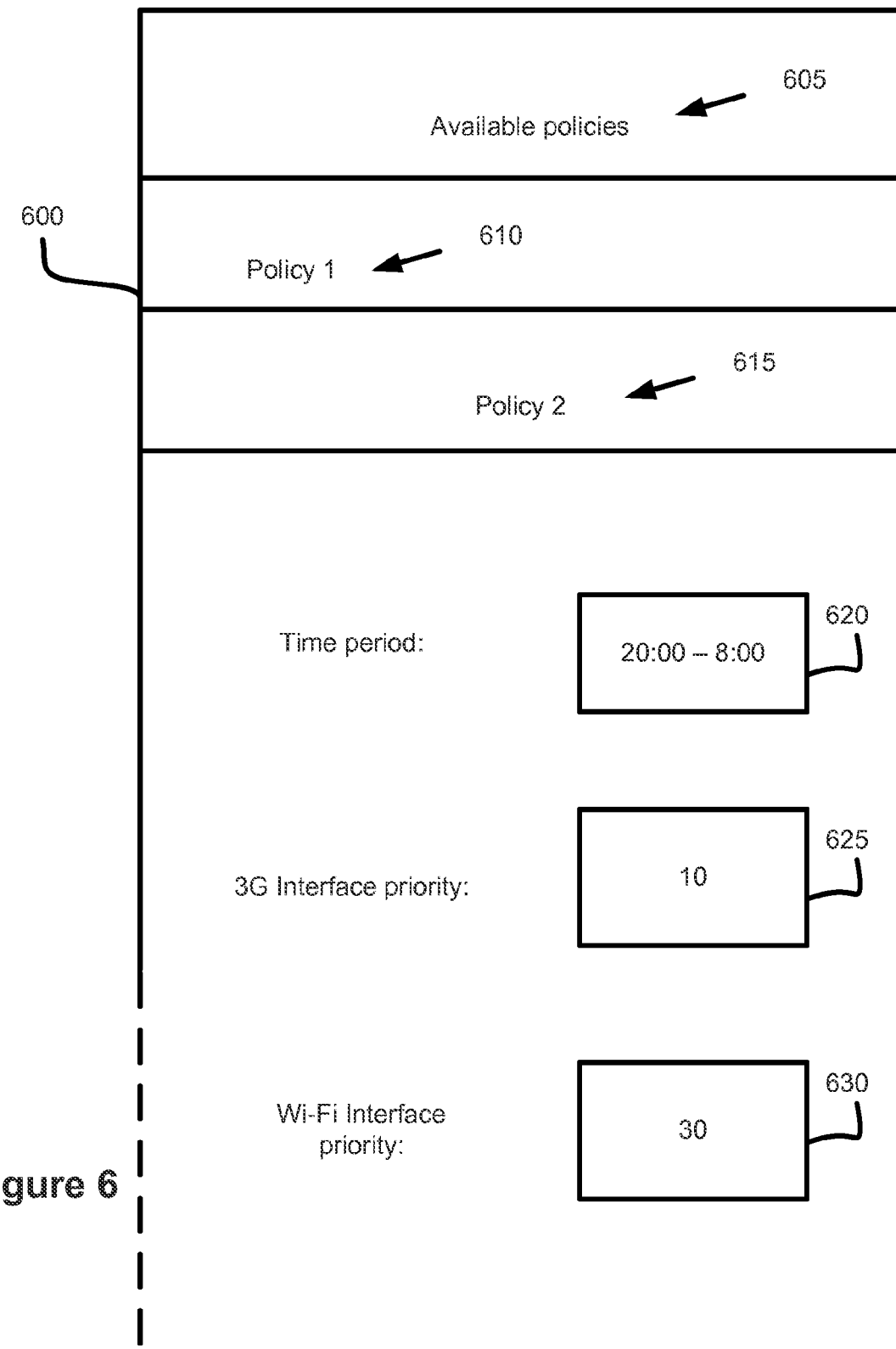
FIG. 6 illustrates an alternative example of a GUI of a UE, in accordance with various embodiments.

FIG. 6 depicts an example of the GUI 600 depicting information elements related to available policies 605. For example, an element 610 depicting a first policy and an element 615 depicting a second policy may be available to the user. By selecting the element 610 related to the first policy, for example, via a touchscreen, or one of the other input options discussed herein, an element 620 related to the time the policy is valid, an element 625 related to cellular radio network priority, an element 630 related to Wi-Fi network relative priority, or other elements may be displayed for the first policy. These different elements 620, 625, or 630 may be respectively similar to elements 525, 530, or 535. By selecting the second policy, the elements 620, 625, and 630 may change and depict information related to the second policy. Based on the depicted values, the user may be able to select one of the available policies as an active policy as shown in FIG. 5. In some embodiments, more, less, or alternative information regarding each of the policies may be displayed.

In some embodiments, the names of the available policies as depicted in elements 610 or 615 may be different. For example, in some embodiments the names of the available policies may be based on a use case for which the policy is optimized. For example, the first policy may be optimized for video streaming, for example, by having a very high QoS, but also resulting in a very high data usage or battery drain. The second policy 615 may be optimized for an alternative use case such as a file transfer or simple data transfer where latency or a lower QoS is acceptable between the UE and one or more of the radio networks. Based on these policy names, the user may be presented with simplified options so that the user does not require a high level of expertise, but rather can easily and intuitively select a policy that matches the user's needs.

Figure 7:
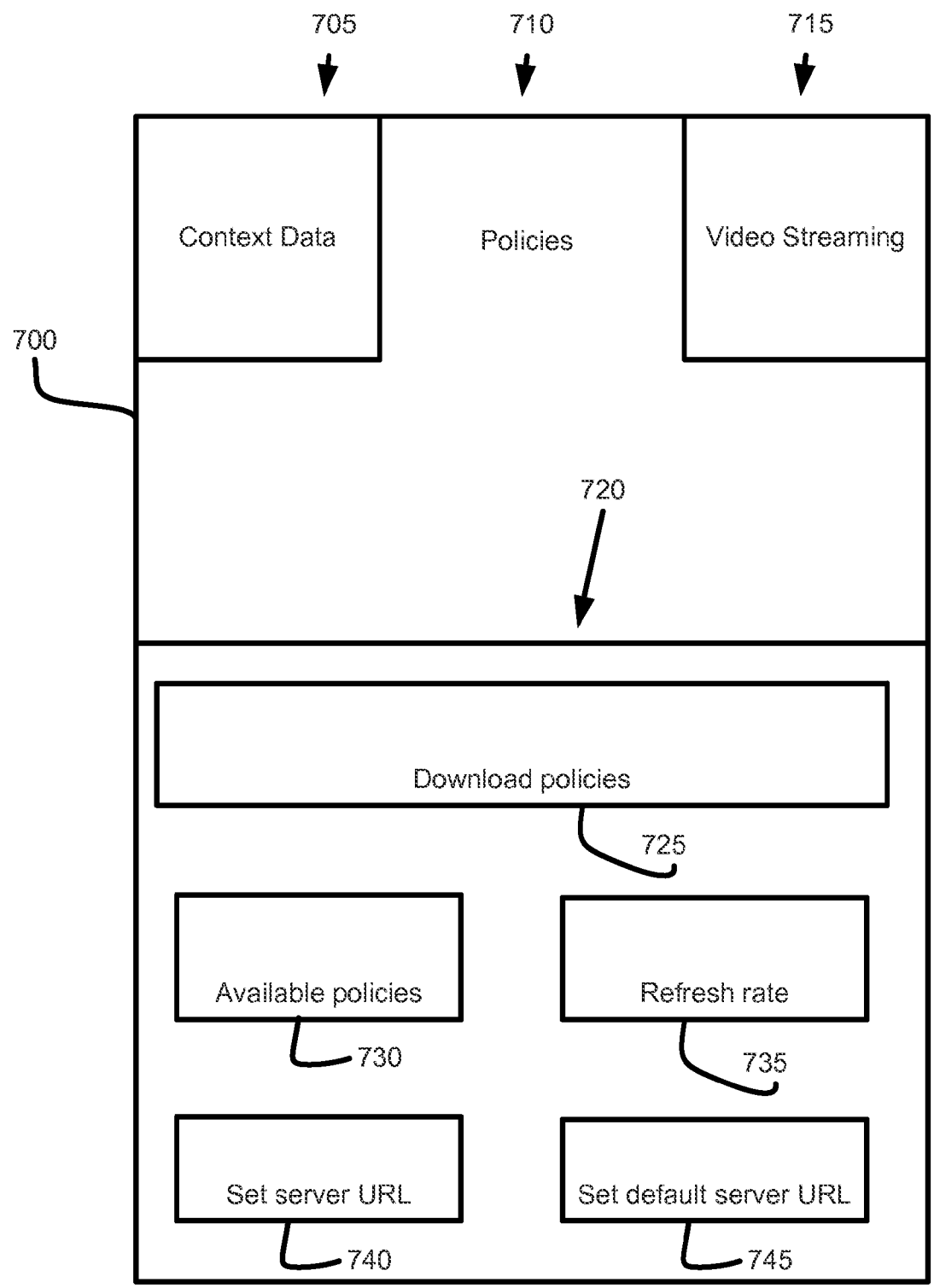
FIG. 7 Illustrates an alternative example of a GUI of a UE, in accordance with various embodiments.

In some embodiments, one or more of the GUIs such as GUIs 300, 400, 500, or 600 may have submenus. For example, a user may be able to select a specific menu or submenu button or option (not shown) using one or more of the input options described herein, and the display of the UE may overlay a submenu on one or more of the above described GUIs. For example, GUI 500 may have a submenu as shown in FIG. 7. For example, the GUI 700 may include a tab related to context data 705, a tab related to policies 710, or a tab related to video streaming 715. In embodiments, GUI 700 may further include a submenu 720. In some embodiments, GUI 700 may include one or more of the additional information elements of GUI 500, but they are not shown in FIG. 7 for the sake of clarity.

Specifically, the GUI 700 submenu 720 may include different elements or options that the user can activate. Specifically, the submenu 720 may include elements for policy download 725, available policies 730, refresh rate 735, setting a server uniform resource locator (URL) 740, or setting a default server URL 745. In embodiments, the elements 725, 730, 735, 740, or 745 may be soft buttons on the touchscreen, clickable via a mouse or other input, a spoken command, or one or more of the other forms of input described herein.

Activation or selection of the policy download element 725 may direct the UE to download network policies from a server or other source, and initiate the radio network decision-making algorithm due to network policy information being modified or updated. Activation or selection of the available policies element 730 may open a pop-up window that displays available policies, for example, as shown with respect to GUI 600. Activation or selection of the refresh rate element 735 may allow the user to modify the time frequency with which network policies are downloaded or updated from a server of the resource. Activation or selection of the server URL element 740 may allow the user the ability to change the URL of the server that hosts the XML network policies file. Activation or selection of the default server URL element 745 may allow the user to reset any changes to the server URL that are made using element 740.

GUI 400 of FIG. 4 may also be associated with a submenu. For example, GUI 800 may depict this submenu of the GUI 400 depicted with respect to FIG. 4. GUI 800 may include a tab related to context data 805, a tab related to policies 810, or a tab related to video streaming 815.

Figure 8:
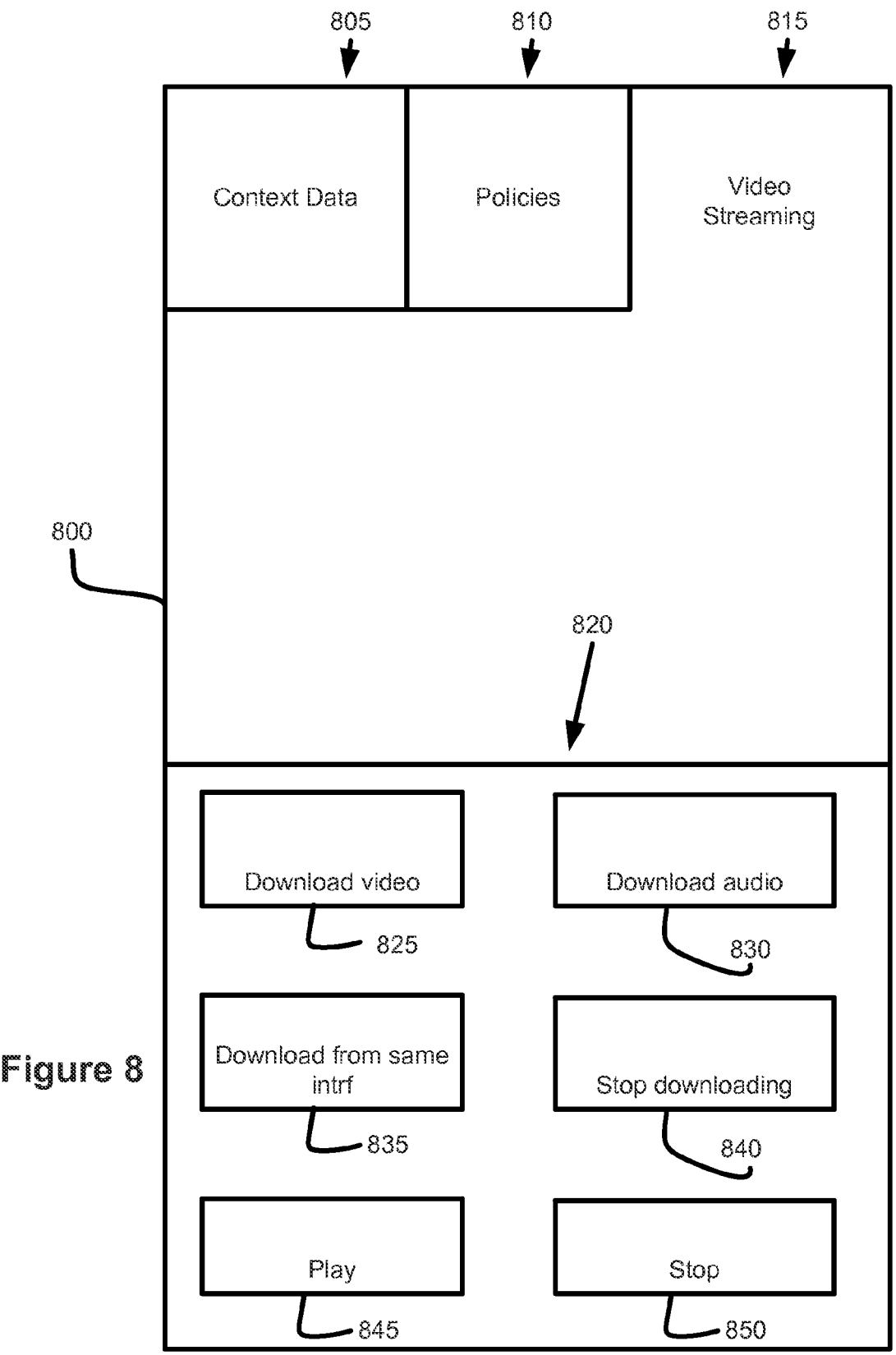
FIG. 8 illustrates an alternative example of a GUI of a UE, in accordance with various embodiments.

In embodiments, GUI 800 may further include a submenu 820. In some embodiments, GUI 800 may include one or more of the additional information elements of GUI 400, but they are not shown in FIG. 8 for the sake of clarity.

Specifically, the GUI 800 submenu 820 may include one or more elements that the user can activate. Specifically, the submenu 820 may include elements related to video download 825, audio download 830, interface selection 835, stopping or pausing a download 840, playing media 845, or stopping playback of media 850. In embodiments, the elements 825, 830, 835, 840, 845, or 850 may be soft buttons on the touchscreen, clickable via a mouse or other input, a spoken command, or one or more of the other forms of input described herein.

Activation or selection of the video download element 825 may initiate the download of the multimedia video file from the network interface or interfaces (i.e., the radio networks or radio links) specified in the policies file. Activation or selection of the audio download element 830 may initiate the download of an audio multimedia file from the network interface or interfaces specified in the policies file. Activation or selection of the interface selection element 835 may initiate the download of both the audio and video multimedia files from a single network interface such as a single radio link or radio network. Activation or selection of the stop downloading element 840 may terminate one or more current downloads previously initiated by the application. Activation or selection of the play element 845 and the stop element 850 may initiate or terminate playback of downloaded or downloading multimedia files, respectively.

Figure 9:
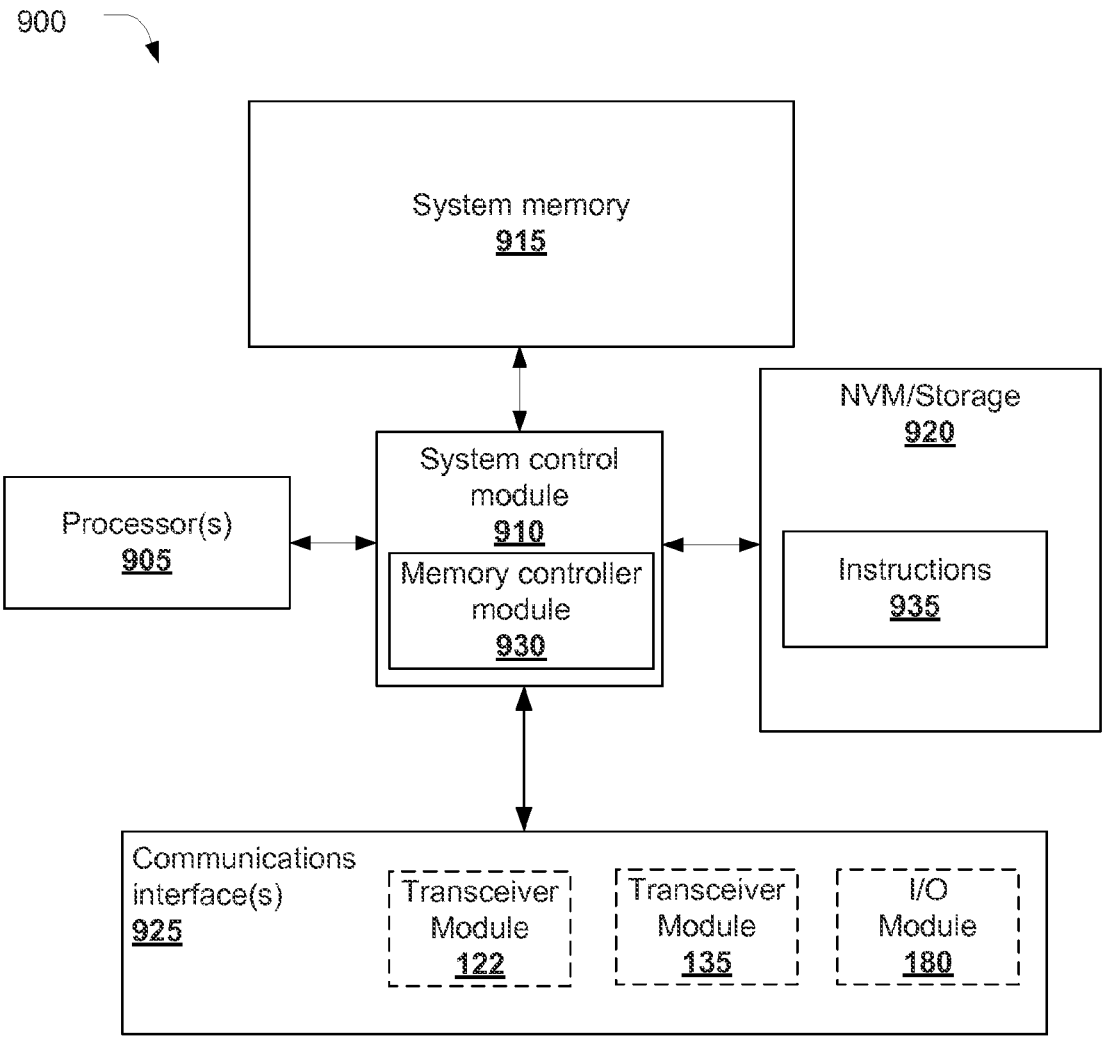
FIG. 9 schematically illustrates an example system that may be used to practice various embodiments described herein.

Embodiments of the present disclosure may be implemented into a system using any suitable hardware and/or software to configure as desired. FIG. 9 schematically illustrates an example system 900 that may be used to practice various embodiments described herein. FIG. 9 illustrates, for one embodiment, an example system 900 having one or more processor(s) 905, system control module 910 coupled to at least one of the processor(s) 905, system memory 915 coupled to system control module 910, non-volatile memory (NVM)/storage 920 coupled to system control module 910, and one or more communications interface(s) 925 coupled to system control module 910.

In some embodiments, the system 900 may be capable of functioning as the UE 110, 215, 220, or 225 as described herein. In other embodiments, the system 900 may be capable of functioning as one of BSs 105, 205, or 210, as described herein. In some embodiments, the system 900 may include one or more computer-readable media (e.g., system memory or NVM/storage 920) having instructions 935 and one or more processors (e.g., processor(s) 905) coupled with the one or more computer-readable media and configured to execute the instructions to implement a module to perform actions described herein. In some embodiments, one or more of the processor(s) 905 may be similar to processor 175 of FIG. 1.

System control module 910 for one embodiment may include any suitable interface controllers to provide for any suitable interface to at least one of the processor(s) 905 and/or to any suitable device or component in communication with system control module 910.

System control module 910 may include memory controller module 930 to provide an interface to system memory 915. The memory controller module 930 may be a hardware module, a software module, and/or a firmware module.

System memory 915 may be used to load and store data and/or instructions, for example, for system 900. System memory 915 for one embodiment may include any suitable volatile memory, such as suitable dynamic random access memory (DRAM), for example. In some embodiments, the system memory 915 may include double data rate type four synchronous dynamic random-access memory (DDR4 SDRAM).

System control module 910 for one embodiment may include one or more input/output (I/O) controller(s) to provide an interface to NVM/storage 920 and communications interface(s) 925. In embodiments, the I/O controller(s) may be similar to I/O module 180 of FIG. 1.

The NVM/storage 920 may be used to store data and/or instructions, for example. NVM/storage 920 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 920 may include a storage resource physically part of a device on which the system 900 may be installed or it may be accessible by, but not necessarily a part of, the device. For example, the NVM/storage 920 may be accessed over a network via the communications interface(s) 925.

Communications interface(s) 925 may provide an interface for system 900 to communicate over one or more network(s) and/or with any other suitable device. The system 900 may wirelessly communicate with the one or more components of the wireless network in accordance with any of one or more wireless network standards and/or protocols. In some embodiments the communications interface(s) 925 may include one or more of the transceiver modules 122 or 135, or I/O module 180.

For one embodiment, at least one of the processor(s) 905 may be packaged together with logic for one or more controller(s) of system control module 910, e.g., memory controller module 930. For one embodiment, at least one of the processor(s) 905 may be packaged together with logic for one or more controllers of system control module 910 to form a System in Package (SiP). For one embodiment, at least one of the processor(s) 905 may be integrated on the same die with logic for one or more controller(s) of system control module 910. For one embodiment, at least one of the processor(s) 905 may be integrated on the same die with logic for one or more controller(s) of system control module 910 to form a System on Chip (SoC).

In some embodiments the processor(s) 905 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or global positioning satellite (GPS) circuitry (not shown).

In various embodiments, the system 900 may be, but is not limited to, a server, a workstation, a desktop computing device, or a mobile computing device (e.g., a laptop computing device, a handheld computing device, a tablet, a netbook, a smartphone, a gaming console, etc.). In various embodiments, the system 900 may have more or less components, and/or different architectures. For example, in some embodiments, the system 900 includes one or more of a camera, a keyboard, liquid crystal display (LCD) screen (including touchscreen displays), non-volatile memory port, multiple antennas, graphics chip, application-specific integrated circuit (ASIC), and speakers.

EXAMPLES

Example 1 may include a user equipment, UE, for communication over multiple radio links, comprising: an input/output module to: present a parameter of a network policy to a user; and receive an indication of a user preference related to the parameter of the network policy; and a radio communication module coupled with the input/output module, the radio communication module to select one or more radio links, among a plurality of radio links supported by the radio communication module, with which the UE should communicatively couple, based on the user preference and the network policy.

Example 2 may include the UE of example 1, wherein the radio communication module is further to transmit or receive data over a selected radio link.

Example 3 may include the UE of example 2, wherein the selected one or more radio links include a first radio link and a second radio link that is different than the first radio link, and wherein the radio communication module is to receive a data over the first radio link and the second radio link at substantially the same time.

Example 4 may include the UE of example 1, wherein the radio communication module is further to alter the network policy or select the network policy as an active network policy based on the indication of the user preference.

Example 5 may include the UE of any of examples 1-4, further comprising a display screen coupled to the input/output module for the I/O module to graphically display the parameter of the network policy, or a speaker coupled to the input/output module to acoustically present the parameter of the network policy.

Example 6 may include the UE of any of examples 1-4, wherein the parameter includes a time period, a priority of a first radio link in the plurality of radio links, a priority of a second radio link in the plurality of radio links, or an indication of a radio link in the plurality of radio links for audio or video data transfer.

Example 7 may include the UE of any of examples 1-4, wherein the input/output module is further to present context data or video streaming data to the user, wherein the context data and the video streaming data are based on the network policy.

Example 8 may include the UE of example 7, wherein the context data includes an element related to a wireless local area network (WLAN), an element related to a cellular network, an element related to a service set identifier (SSID) of the WLAN network, an element related to an internet protocol (IP) address of the WLAN network, an element related to signal strength of the WLAN network, an element related to a network operator of the cellular network, an element related to an IP address of the cellular network, or an element related to signal strength of the cellular network.

Example 9 may include the UE of example 7, wherein the video streaming data includes an element related to a cellular radio network, an element related to a wireless local area network (WLAN) network, an element related to an interface, an element related to download speed of the WLAN network, an element related to download speed of the cellular radio network, or an element related to a total amount of data received over the WLAN network and the cellular radio network.

Example 10 may include the UE of any of examples 1-4, wherein the network policy is a network policy related to a file transfer protocol, FTP, transmission to the UE, a video data transmission to the UE, an audio transmission to the UE, a user-specific policy, or an application-specific policy.

Example 11 may include the UE of any of examples 1-4, wherein the UE is a smartphone.

Example 12 may include the UE of any of examples 1-4, wherein the plurality of radio links include a radio link of a third generation partnership project (3GPP) LTE network, a Wi-Fi network, a Global System for Mobile Communications (GSM) radio communication network, a General Packet Radio Service (GPRS) radio communication network, an Enhanced Data Rates for GSM Evolution (EDGE) radio communication network, a 3GPP universal mobile telecommunications system (UMTS) network, a freedom of multimedia access (FOMA) network, a 3GPP LTE-Advanced (LTE-A) network, a code division multiple access 2000 (CDMA2000) network, a Cellular Digital Packet Data (CDPD) network, a Mobitex network, a Third Generation (3G) network, a Circuit Switched Data (CSD) network, a high-speed CSD (HSCSD) network, a wideband code division multiple access (W-CDMA) network, a High Speed Packet Access (HSPA) network, a High-Speed Downlink Packet Access (HSDPA) network, a High-Speed Uplink Packet Access (HSUPA) network, a High Speed Packet Access Plus (HSPA+) network, a UMTS-Time-division duplex (UMTS-TDD), a Time Division-Code Division Multiple Access (TD-CDMA) network, a TD-Synchronous Code Division Multiple Access (TD-SCDMA) network, a 3GPP Release 8, 9, 10, 11, or 12 network, a UMTS Terrestrial Radio Access (UTRA) network, an evolved UTRA (E-UTRA) network, a fourth generation (4G) network, a cdmaOne network, an Evolution-Data Optimized or Evolution-Data Only (EV-DO) network, an Advanced Mobile Phone System (AMPS) network, a Total Access Communication System/Extended Total Access Communication System (TACS/ETACS) network, a Digital AMPS (D-AMPS) network, a Push-to-Talk (PTT) network, a Mobile Telephone System (MTS) network, an improved MTS (IMTS) network, an advanced MTS (AMTS) network, an Offentlig Landmobil Telefoni (OLT) network, a Mobiltelefonisystem D or Mobile telephony system D (MTD) network, a Public Automated Land Mobile (Autotel/PALM) network, an Autoradiopuhelin (ARP) network, a Nordic Mobile Telephony (NMT) network, a Nippon Telegraph and Telephone (NTT) hicapacity (Hicap) network, a DataTAC network, an Integrated Digital Enhanced Network (iDEN) network, a Personal Digital Cellular (PDC) network, a Circuit Switched Data (CSD) network, a Personal Handy-phone System (PHS) network, a Wideband Integrated Digital Enhanced Network (WiDEN) network, an iBurst network, or an Unlicensed Mobile Access network (UMA).

Example 13 may include a method for selective communication over multiple radio links, comprising: receiving, at a user equipment, UE, a network policy related to one or more of a plurality of radio links supported by the UE; presenting, by the UE, a parameter of the network policy to a user; receiving, by the UE, an indication of a user preference related to the parameter of the network policy; and selecting, by the UE, one or more radio links from among the plurality of radio links based on the user preference and the network policy.

Example 14 may include the method of example 13, further comprising altering the network policy or selecting the network policy as an active network policy based on the indication of the user preference.

Example 15 may include the method of example 13, wherein the selecting the radio link includes selecting a first radio link and a second radio link in the plurality of radio links, wherein the first radio link is different from the second radio link; connecting, by the UE, to the first radio link and the second radio link; and receiving, by the UE, a first portion of a data over the first radio link concurrently with receiving a second portion of the data over the second radio link.

Example 16 may include the method of any of examples 13-15, wherein the parameter includes a time period, a priority of a first radio link in the plurality of radio links, a priority of a second radio link in the plurality of radio links, or an indication of a radio link in the plurality of radio links for audio or video data transfer.

Example 17 may include the method of any of examples 13-15, wherein the presenting includes graphically and/or acoustically presenting the parameter of the network policy to the user.

Example 18 may include the method of any of examples 13-15, further comprising presenting, by the UE, context data or video streaming data to the user, wherein the context data and the video streaming data are based on the network policy.

Example 19 may include the method of example 18, wherein the context data includes an element related to a wireless local area network (WLAN), an element related to a cellular network, an element related to a service set identifier (SSID) of the WLAN network, an element related to an internet protocol (IP) address of the WLAN network, an element related to signal strength of the WLAN network, an element related to a network operator of the cellular network, an element related to an IP address of the cellular network, or an element related to signal strength of the cellular network.

Example 20 may include the method of example 18, wherein the video streaming data includes an element related to a cellular radio network, an element related to a wireless local area network (WLAN) network, an element related to an interface, an element related to download speed of the WLAN network, an element related to download speed of the cellular radio network, or an element related to a total amount of data received over the WLAN network and the cellular radio network.

Example 21 may include themethod of any of examples 13-15, wherein the network policy is a network policy related to a file transfer protocol, FTP, transmission to the UE, a video data transmission to the UE, an audio transmission to the UE, a user-specific policy, or an application-specific policy.

Example 22 may include the method of any of examples 13-15, wherein the UE is a smartphone.

Example 23 may include the method of any of examples 13-15, wherein the plurality of radio links include a radio link of a third generation partnership project (3GPP) LTE network, a Wi-Fi network, a Global System for Mobile Communications (GSM) radio communication network, a General Packet Radio Service (GPRS) radio communication network, an Enhanced Data Rates for GSM Evolution (EDGE) radio communication network, a 3GPP universal mobile telecommunications system (UMTS) network, a freedom of multimedia access (FOMA) network, a 3GPP LTE-Advanced (LTE-A) network, a code division multiple access 2000 (CDMA2000) network, a Cellular Digital Packet Data (CDPD) network, a Mobitex network, a Third Generation (3G) network, a Circuit Switched Data (CSD) network, a high-speed CSD (HSCSD) network, a wideband code division multiple access (W-CDMA) network, a High Speed Packet Access (HSPA) network, a High-Speed Downlink Packet Access (HSDPA) network, a High-Speed Uplink Packet Access (HSUPA) network, a High Speed Packet Access Plus (HSPA+) network, a UMTS-Time-division duplex (UMTS-TDD), a Time Division-Code Division Multiple Access (TD-CDMA) network, a TD-Synchronous Code Division Multiple Access (TD-SCDMA) network, a 3GPP Release 8, 9, 10, 11, or 12 network, a UMTS Terrestrial Radio Access (UTRA) network, an evolved UTRA (E-UTRA) network, a fourth generation (4G) network, a cdmaOne network, an Evolution-Data Optimized or Evolution-Data Only (EV-DO) network, an Advanced Mobile Phone System (AMPS) network, a Total Access Communication System/Extended Total Access Communication System (TACS/ETACS) network, a Digital AMPS (D-AMPS) network, a Push-to-Talk (PTT) network, a Mobile Telephone System (MTS) network, an improved MTS (IMTS) network, an advanced MTS (AMTS) network, an Offentlig Landmobil Telefoni (OLT) network, a Mobiltelefonisystem D or Mobile telephony system D (MTD) network, a Public Automated Land Mobile (Autotel/PALM) network, an Autoradiopuhelin (ARP) network, a Nordic Mobile Telephony (NMT) network, a Nippon Telegraph and Telephone (NTT) hicapacity (Hicap) network, a DataTAC network, an Integrated Digital Enhanced Network (iDEN) network, a Personal Digital Cellular (PDC) network, a Circuit Switched Data (CSD) network, a Personal Handyphone System (PHS) network, a Wideband Integrated Digital Enhanced Network (WiDEN) network, an iBurst network, or an Unlicensed Mobile Access network (UMA).

Example 24 may include one or more non-transitory computer-readable media comprising instructions to cause a user equipment, UE, upon execution of the instructions by one or more processors of the UE, to: identify a network policy related to one or more of a plurality of radio links supported by the UE; present a parameter of the network policy to a user; receive an indication of a user preference related to the parameter of the network policy; and select a radio link from the plurality of radio links based on the user preference and the network policy.

Example 25 may include the one or more non-transitory computer-readable media of example 24, wherein the instructions are further to alter the network policy or select the network policy as an active network policy based on the indication of the user preference.

Example 26 may include the one or more non-transitory computer-readable media of example 24, wherein the instructions to select the radio link include instructions to select a first radio link and a second radio link in the plurality of radio links, wherein the first radio link is different from the second radio link; connect to the first radio link and the second radio link; and receive a first portion of a data over the first radio link concurrently with reception of a second portion of the data over the second radio link.

Example 27 may include the one or more non-transitory computer-readable media of any of examples 24-26, wherein the parameter includes a time period, a priority of a first radio link in the plurality of radio links, a priority of a second radio link in the plurality of radio links, or an indication of a radio link in the plurality of radio links for audio or video data transfer.

Example 28 may include the one or more non-transitory computer-readable media of any of examples 24-26, wherein the instructions to present the parameter include instructions to present the parameter using a display screen or acoustic speaker of the UE.

Example 29 may include the one or more non-transitory computer-readable media of any of examples 24-26, wherein the instructions further include instructions to present context data or video streaming data to the user, wherein the context data and the video streaming data are based on the network policy.

Example 30 may include the one or more non-transitory computer-readable media of example 29, wherein the context data includes an element related to a wireless local area network (WLAN), an element related to a cellular network, an element related to a service set identifier (SSID) of the WLAN network, an element related to an internet protocol (IP) address of the WLAN network, an element related to signal strength of the WLAN network, an element related to a network operator of the cellular network, an element related to an IP address of the cellular network, or an element related to signal strength of the cellular network.

Example 31 may include theone or more non-transitory computer-readable media of example 29, wherein the video streaming data includes an element related to a cellular radio network, an element related to a wireless local area network (WLAN) network, an element related to an interface, an element related to download speed of the WLAN network, an element related to download speed of the cellular radio network, or an element related to a total amount of data received over the WLAN network and the cellular radio network.

Example 32 may include the one or more non-transitory computer-readable media of any of examples 24-26, wherein the network policy is a network policy related to a file transfer protocol, FTP, transmission to the UE, a video data transmission to the UE, an audio transmission to the UE, a user-specific policy, or an application-specific policy.

Example 33 may include the one or more non-transitory computer-readable media of any of examples 24-26, wherein the UE is a smartphone.

Example 34 may include the one or more non-transitory computer-readable media of any of examples 24-26, wherein the plurality of radio links include a radio link of a third generation partnership project (3GPP) LTE network, a Wi-Fi network, a Global System for Mobile Communications (GSM) radio communication network, a General Packet Radio Service (GPRS) radio communication network, an Enhanced Data Rates for GSM Evolution (EDGE) radio communication network, a 3GPP universal mobile telecommunications system (UMTS) network, a freedom of multimedia access (FOMA) network, a 3GPP LTE-Advanced (LTE-A) network, a code division multiple access 2000 (CDMA2000) network, a Cellular Digital Packet Data (CDPD) network, a Mobitex network, a Third Generation (3G) network, a Circuit Switched Data (CSD) network, a high-speed CSD (HSCSD) network, a wideband code division multiple access (W-CDMA) network, a High Speed Packet Access (HSPA) network, a High-Speed Downlink Packet Access (HSDPA) network, a High-Speed Uplink Packet Access (HSUPA) network, a High Speed Packet Access Plus (HSPA+) network, a UMTS-Time-division duplex (UMTS-TDD), a Time Division-Code Division Multiple Access (TD-CDMA) network, a TD-Synchronous Code Division Multiple Access (TD-SCDMA) network, a 3GPP Release 8, 9, 10, 11, or 12 network, a UMTS Terrestrial Radio Access (UTRA) network, an evolved UTRA (E-UTRA) network, a fourth generation (4G) network, a cdmaOne network, an Evolution-Data Optimized or Evolution-Data Only (EV-DO) network, an Advanced Mobile Phone System (AMPS) network, a Total Access Communication System/Extended Total Access Communication System (TACS/ETACS) network, a Digital AMPS (D-AMPS) network, a Push-to-Talk (PTT) network, a Mobile Telephone System (MTS) network, an improved MTS (IMTS) network, an advanced MTS (AMTS) network, an Offentlig Landmobil Telefoni (OLT) network, a Mobiltelefonisystem D or Mobile telephony system D (MTD) network, a Public Automated Land Mobile (Autotel/PALM) network, an Autoradiopuhelin (ARP) network, a Nordic Mobile Telephony (NMT) network, a Nippon Telegraph and Telephone (NTT) hicapacity (Hicap) network, a DataTAC network, an Integrated Digital Enhanced Network (iDEN) network, a Personal Digital Cellular (PDC) network, a Circuit Switched Data (CSD) network, a Personal Handy-phone System (PHS)

network, a Wideband Integrated Digital Enhanced Network (WiDEN) network, an iBurst network, or an Unlicensed Mobile Access network (UMA).

Example 35 may include an apparatus for selective communication over multiple radio links, comprising: means for receiving a network policy related to one or more of a plurality of radio links supported by the apparatus; means for presenting a parameter of the network policy to a user; means for receiving an indication of a user preference related to the parameter of the network policy; and means for selecting one or more radio links from among the plurality of radio links based on the user preference and the network policy.

Example 36 may include the apparatus of example 35, further comprising means for altering the network policy or selecting the network policy as an active network policy based on the indication of the user preference.

Example 37 may include the apparatus of example 35, wherein the means for selecting the radio link includes means for selecting a first radio link and a second radio link in the plurality of radio links, wherein the first radio link is different from the second radio link; means for connecting to the first radio link and the second radio link; and means for receiving a first portion of a data over the first radio link concurrently with receiving a second portion of the data over the second radio link.

Example 38 may include the apparatus of any of examples 35-37, wherein the parameter includes a time period, a priority of a first radio link in the plurality of radio links, a priority of a second radio link in the plurality of radio links, or an indication of a radio link in the plurality of radio links for audio or video data transfer.

Example 39 may include the apparatus of any of examples 35-37, wherein the means for presenting includes means for graphically and/or acoustically presenting the parameter of the network policy to the user.

Example 40 may include the apparatus of any of examples 35-37, further comprising means for presenting context data or video streaming data to the user, wherein the context data and the video streaming data are based on the network policy.

Example 41 may include the apparatus of example 40, wherein the context data includes an element related to a wireless local area network (WLAN), an element related to a cellular network, an element related to a service set identifier (SSID) of the WLAN network, an element related to an internet protocol (IP) address of the WLAN network, an element related to signal strength of the WLAN network, an element related to a network operator of the cellular network, an element related to an IP address of the cellular network, or an element related to signal strength of the cellular network.

Example 42 may include the apparatus of example 40, wherein the video streaming data includes an element related to a cellular radio network, an element related to a wireless local area network (WLAN) network, an element related to an interface, an element related to download speed of the WLAN network, an element related to download speed of the cellular radio network, or an element related to a total amount of data received over the WLAN network and the cellular radio network.

Example 43 may include the apparatus of any of examples 35-37, wherein the network policy is a network policy related to a file transfer protocol, FTP, transmission to the apparatus, a video data transmission to the apparatus, an audio transmission to the apparatus, a user-specific policy, or an application-specific policy.

Example 44 may include the apparatus of any of examples 35-37, wherein the apparatus is a smartphone.

Example 45 may include the apparatus of any of examples 35-37, wherein the plurality of radio links include a radio link of a third generation partnership project (3GPP) LTE network, a Wi-Fi network, a Global System for Mobile Communications (GSM) radio communication network, a General Packet Radio Service (GPRS) radio communication network, an Enhanced Data Rates for GSM Evolution (EDGE) radio communication network, a 3GPP universal mobile telecommunications system (UMTS) network, a freedom of multimedia access (FOMA) network, a 3GPP LTE-Advanced (LTE-A) network, a code division multiple access 2000 (CDMA2000) network, a Cellular Digital Packet Data (CDPD) network, a Mobitex network, a Third Generation (3G) network, a Circuit Switched Data (CSD) network, a high-speed CSD (HSCSD) network, a wideband code division multiple access (W-CDMA) network, a High Speed Packet Access (HSPA) network, a High-Speed Downlink Packet Access (HSDPA) network, a High-Speed Uplink Packet Access (HSUPA) network, a High Speed Packet Access Plus (HSPA+) network, a UMTS-Time-division duplex (UMTS-TDD), a Time Division-Code Division Multiple Access (TD-CDMA) network, a TD-Synchronous Code Division Multiple Access (TD-SCDMA) network, a 3GPP Release 8, 9, 10, 11, or 12 network, a UMTS Terrestrial Radio Access (UTRA) network, an evolved UTRA (E-UTRA) network, a fourth generation (4G) network, a cdmaOne network, an Evolution-Data Optimized or Evolution-Data Only (EV-DO) network, an Advanced Mobile Phone System (AMPS) network, a Total Access Communication System/Extended Total Access Communication System (TACS/ETACS) network, a Digital AMPS (D-AMPS) network, a Push-to-Talk (PTT) network, a Mobile Telephone System (MTS) network, an improved MTS (IMTS) network, an advanced MTS (AMTS) network, an Offentlig Landmobil Telefoni (OLT) network, a Mobiltelefonisystem D or Mobile telephony system D (MTD) network, a Public Automated Land Mobile (Autotel/PALM) network, an Autoradiopuhelin (ARP) network, a Nordic Mobile Telephony (NMT) network, a Nippon Telegraph and Telephone (NTT) hicapacity (Hicap) network, a DataTAC network, an Integrated Digital Enhanced Network (iDEN) network, a Personal Digital Cellular (PDC) network, a Circuit Switched Data (CSD) network, a Personal Handyphone System (PHS) network, a Wideband Integrated Digital Enhanced Network (WiDEN) network, an iBurst network, or an Unlicensed Mobile Access network (UMA).

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A user equipment, UE, for communication over multiple radio links, comprising:
a graphical user interface (GUI) having a plurality of portions, including a network policy portion and at least a selected one of a context data portion or a video streaming portion;

an input/output module to:
presenting via the network policy portion of the GUI a plurality of parameters of a network policy received from a network operator to a user, including a time period the network policy is active, a priority of a first radio link during the time period, and a priority of a second radio link during the time period, of a plurality of different radio links supported by the UE; and
receive one or more indications of a user preference related to one or more of the plurality of parameters of the network policy; and
a radio communication module coupled with the input/output module, the radio communication module to select one of the first and second radio links, with which the UE communicates with the network operator, based on the network policy, including the user preference expressed by the user for the one or more parameters of the network policy.

2. The UE of claim 1, wherein the radio communication module is further to transmit or receive data over a selected radio link.

3. The UE of claim 1, wherein the radio communication module is further to alter the network policy based on the indication of the user preference for the one or more parameters of the network policy.

4. The UE of claim 1, further comprising a speaker coupled to the input/output module to acoustically present the plurality of parameters of the network policy for the user to indicate the user's preference.

5. The UE of claim 1, wherein the plurality of parameters of the network policy further include an indication of a radio link in the plurality of radio links to be used for audio or video data transfer.

6. The UE of claim 1, wherein the input/output module is to further present context data to the user through the context data portion of the GUI, wherein the context data includes an element related to a wireless local area network (WLAN), an element related to a cellular network, an element related to a service set identifier (SSID) of the WLAN network, an element related to an internet protocol (IP) address of the WLAN network, an element related to signal strength of the WLAN network, an element related to a network operator of the cellular network, an element related to an IP address of the cellular network, or an element related to signal strength of the cellular network.

7. The UE of claim 1, wherein the input/output module is to further present video streaming data to the user through the video streaming portion of the GUI, wherein the video streaming data includes an element related to a cellular radio network, an element related to a wireless local area network (WLAN) network, an element related to an interface, an element related to download speed of the WLAN network, an element related to download speed of the cellular radio network, or an element related to a total amount of data received over the WLAN network and the cellular radio network.

8. The UE of claim 1, wherein the network policy is a network policy related to a file transfer protocol, FTP, transmission to the UE, a video data transmission to the UE, an audio transmission to the UE, a user-specific policy, or an application-specific policy.

9. The UE of claim 1, wherein the UE is a smartphone.

10. The UE of claim 1, wherein one of the network policy portion, the context data portion and the video streaming portion of the GUI is selectively presented to the user at any one point in time.

11. A method for selective communication over multiple radio links, comprising:

receiving, at a user equipment, UE, from a network operator, a network policy related to one or more of a plurality of radio links supported by the UE;
presenting, by the UE, a plurality of parameters of the network policy to a user, in a network policy portion of graphical user interface (GUI) having a plurality of portions, including the network policy portion and at least one of a context data portion or a video streaming portion;
receiving, by the UE, one or more indications of a user preference related to one or more of the plurality of parameters of the network policy, wherein the plurality of parameters of the network policy include a time period the network policy is active, a priority of a first radio link during the time period, and a priority of a second radio link during the time period, of a plurality of different radio links supported by the UE; and
selecting, by the UE, one of the first and second radio links based on the network policy, including user preference received for the one or more parameters of the network policy.

12. The method of claim 11, further comprising altering the network policy based on the indication of the user preference.

13. The method of claim 11, wherein selecting the radio link includes selecting, by the UE, a first radio link and a second radio link in the plurality of radio links, wherein the first radio link is different from the second radio link;
connecting, by the UE, to the first radio link and the second radio link; and
receiving, by the UE, a first portion of a data over the first radio link concurrently with receiving a second portion of the data over the second radio link.

14. The method of claim 11, wherein the plurality of parameters of the network policy further an indication of a radio link in the plurality of radio links to be used for audio or video data transfer.

15. The method of claim 11, further comprising acoustically presenting, by the UE, the plurality of parameters of the network policy to the user.

16. The method of claim 11, further comprising presenting to the user, by the UE, context data via the context data portion of the GUI or video streaming data via the video streaming portion of the GUI to the user, wherein one of the network policy portion, the context data portion, and the video streaming data portion of the GUI is selectively presented to the user at any one point in time.

17. One or more non-transitory computer-readable media comprising instructions to cause a user equipment, UE, upon execution of the instructions by one or more processors of the UE, to cause the UE to:
identify a network policy related to a plurality of different radio links supported by the UE;
present a graphical user interface (GUI) to a user of the UE, including a network policy portion having a plurality parameters of the network policy, wherein the GUI includes the network policy portion and at least one of a context data portion or a video streaming portion, and wherein the plurality of parameters of the network policy include a time period the network policy is active, a priority of a first radio link during the time period, and a priority of a second radio link during the time period, of the plurality of radio links;
receive one or more indications of a user preference related to one or more of the parameters of the network policy; and select a radio link from the plurality of radio links based on the network policy, including the user preference received for the one or more parameters of the network policy.

18. The one or more non-transitory computer-readable media of claim 17, wherein the instructions are further to cause the UE to alter the network policy or select the network policy as an active network policy based on the indication of the user preference.

19. The one or more non-transitory computer-readable media of claim 17, wherein the instructions are to further cause the UE to select a first radio link and a second radio link in the plurality of radio links, wherein the first radio link is different from the second radio link;
   connect to the first radio link and the second radio link; and
   receive a first portion of a data over the first radio link concurrently with reception of a second portion of the data over the second radio link.

20. The one or more non-transitory computer-readable media of claim 17, wherein the plurality of parameters of the network policy further include an indication of a radio link in the plurality of radio links to be used for audio or video data transfer.

21. The one or more non-transitory computer-readable media of claim 17, wherein the instructions are to further cause the UE to present the plurality of parameters of the network policy via an acoustic speaker of the UE.

22. The one or more non-transitory computer-readable media of claim 17, wherein the instructions further include instructions to cause the UE to present context data via the context data portion of the GUI and video streaming data via the video streaming data portion of the GUI to the user, wherein the UE is caused to selectively present one of the network policy portion, the context data portion and the video streaming data portion of the GUI to the user, in any one point of time.

\* \* \* \* \*